United States Patent [19]

Denz et al.

[11] Patent Number: 5,379,638

[45] Date of Patent: Jan. 10, 1995

[54] METHOD AND DEVICE FOR DETECTING THE FLUID LEVEL IN A TANK

[75] Inventors: Helmut Denz, Stuttgart; Andreas Blumenstock, Ludwigsburg, both of Germany

[73] Assignee: Robert Bosch GmbH, Stuttgart, Germany

[21] Appl. No.: 107,659

[22] PCT Filed: Jan. 13, 1993

[86] PCT No.: PCT/DE93/00012

§ 371 Date: Aug. 12, 1993

§ 102(e) Date: Aug. 12, 1993

[87] PCT Pub. No.: WO92/05408

PCT Pub. Date: Apr. 2, 1992

[30] Foreign Application Priority Data

Feb. 4, 1992 [DE] Germany ............... 4203099

[51] Int. Cl.$^6$ ............... G01F 23/00; G01F 23/14
[52] U.S. Cl. ............... 73/291; 73/299
[58] Field of Search ............... 73/290 R, 299, 301, 73/302, 303, 291

[56] References Cited

U.S. PATENT DOCUMENTS

| | | | |
|---|---|---|---|
| 4,949,070 | 8/1990 | Wetzel | 73/303 |
| 5,090,242 | 3/1992 | Hilton | 73/301 |
| 5,146,783 | 9/1992 | Jansche et al. | 73/301 |

FOREIGN PATENT DOCUMENTS

| | | |
|---|---|---|
| 0453709 | 10/1991 | European Pat. Off. . |
| 0503279 | 9/1992 | European Pat. Off. . |
| 0593529 | 8/1925 | France ............... 73/303 |
| 1278748 | 9/1968 | Germany ............... 73/303 |
| 3929506 | 3/1991 | Germany . |
| 4003751 | 8/1991 | Germany . |
| 0503280 | 9/1992 | Germany . |
| 4111361 | 10/1992 | Germany . |
| 92005408 | 4/1992 | WIPO ............... 73/302 |

*Primary Examiner*—Diego F. F. Gutierrez
*Attorney, Agent, or Firm*—Michael J. Striker

[57] ABSTRACT

A device for detecting the fluid level in the tank of a motor vehicle has a tank leaktightness testing device, a gas evolution testing device for testing whether the fuel in the tank vaporizes, a pumping-out/sequence control deice for subjecting the tank to a change procedure, a gradient detection device for detecting the value of a pressure change gradient parameter from at least one pressure change and one time period associated therewith, and a fluid level output device which receives the signals from the tank leaktightness testing device, the gas evolution testing device and the gradient detection device in order to output the instantaneous value of the fluid level with the aid of a known interrelation between pressure change gradient parameter and fluid level whenever the tank is sufficiently leaktight and the vaporization of the fuel is sufficiently low. With this device it is possible to carry out a method which, does not rely on the signal from a fluid-level sensor in order to detect the tank fluid level, which signal is accordingly riot conducted with special lines to a control device and does not have to be digitized there. Rather, pressure signal values are used such as are received in any case by the control device for reliably testing the operability of a tank venting system which interacts with the tank.

12 Claims, 4 Drawing Sheets

METHOD AND DEVICE FOR DETECTING THE FLUID LEVEL IN A TANK

BACKGROUND OF THE INVENTION

The present invention relates to a method and a device for detecting the fluid level of fuel in the tank of a motor vehicle.

Every motor vehicle with an internal combustion engine has a tank fluid-level sensor which is usually a device which checks the level of a float in the fuel tank and outputs a signal dependent on the level of the float.

A large number of motor vehicles have control devices in which operating parameter signals are subjected to digital data processing. For this purpose, the sensors whose signals are to be processed must be fed to the control device via lines and most of these signals must be digitized since they are initially present as analog signals. Because of the expenditure which is associated with the routing of the lines and the digitization, efforts are made to use as few signals as possible. The signal of the fluid-level sensor is one which typically is not processed in a control device. However, for various purposes, for example in conjunction with functions carried out in a tank venting system, it would be useful to know roughly the tank fluid-level.

If a signal relating to an operating parameter of interest is not fed to a control device, efforts are made to estimate the instantaneous value of the operating parameter which is of interest as satisfactorily as possible from values of other operating parameters concerning which the control device receives signals. In the present case, these can only be signals which originate from the tank and/or the tank venting system connected to it.

In vehicles with a tank venting system it is obligatory to check the operability of the said system to function, i.e. to investigate whether the system is leaktight and not clogged. In accordance with a catalogue of proposed requirements from the Californian Environmental Authority (CARB) published in 1989, testing is to take place in that lean correction testing is carried out with the aid of a lambda controller when certain conditions which make vaporization of the fuel very likely are fulfilled. If, in fact, a lean correction is required, it is assumed that fuel vapour has passed correctly through the tank venting system into the intake line of the motor vehicle so that the system is assessed to be leaktight and not clogged.

U.S. Pat. No. 4,962,744 discloses a method which utilizes a temperature sensor arranged in the adsorption filter of

SUMMARY OF THE INVENTION

Accordingly, it is an object of the present invention to provide a method and device for detecting a fluid level in a tank, which avoids the disadvantages of the prior art.

In keeping with these objects and with others which will become apparent hereinafter, one feature of the present invention resides, briefly stated, in a changes such as occur during adsorption and desorption of fuel during a tank-filling process or during subsequent regeneration in an adsorption filter. The detected temperature changes are compared with predetermined values in order thus to determine whether the system is leaktight and not clogged.

DE-A-40,03,751 discloses a tank venting system which has a tank with tank pressure sensor, an adsorption filter which is connected to the tank via a tank connecting line and has a venting line which can be closed by means of a shut-off valve, and a tank venting valve which is connected to the adsorption filter via a valve line. In order to determine operability to function, the tank venting system thus constructed is operated in such a way that the shut-off valve is closed and then the system is pumped out via the tank venting valve with the aid of the partial vacuum in the intake line. If a predetermined partial vacuum is not achieved, the system is assessed as functionally defective.

In DE-A-41,11,361 which is part of a prior application but does not constitute a prior publication, a method for checking the leaktightness of a tank venting system is described which does not operate with the abovementioned pressure comparison but rather with pressure gradient comparisons. For this purpose, the pressure build-up gradient is determined during the pumping out of the system and/or the pressure reduction gradient is determined when the system has been closed off completely after pumping out. If at least one of the gradients does not satisfy a predetermined condition, the system is assessed as functionally defective.

The entire prior art gives no indication as to how the fluid level of fuel in the tank could be detected with the aid of signals which are measured at a tank and/or a tank venting system.

It has been a problem to indicate a method and a device for indirectly detecting the fluid level of fuel in the tank of a motor vehicle.

Presentation of the Invention

The method according to the invention is characterized in that it is assessed whether the tank at least achieves a predetermined degree of leaktightness and whether the fuel vaporizes less than corresponds to a predetermined value and then, if these conditions are fulfilled, the fluid level is detected, in that the volume of the tank is subjected to a pressure change sequence;

from at least one achieved pressure change and one time period associated therewith, the associated value of a pressure change gradient parameter is determined; and the instantaneous value of the fluid level is estimated from a known interrelation between pressure change gradient parameter and fluid level.

The device according to the invention is characterized by the following function groups:

a tank leaktightness testing device;

a gas evolution testing device for testing whether the fuel in the tank vaporizes;

a pumping-out/sequence control device for subjecting the tank to a change procedure;

a gradient detection device for detecting the value of a pressure change gradient parameter from at least one pressure change and one time period associated therewith; and a fluid level output device which receives the signals from the tank leaktightness testing device, the gas evolution testing device and the gradient detection device in order to output the instantaneous value of the fluid level with the ,aid of a known interrelation between pressure change gradient parameter and fluid level whenever the tank is sufficiently leaktight and the vaporization of the fuel is sufficiently low.

The tank leaktightness test can be effected in any desired manner, that is to say for example by means of a temperature test, a pressure test or a lean correction test when certain conditions which imply the fuel is vaporizing are present. It is particularly advantageous to use a pressure test since in the method according to the invention the fluid level is ultimately determined from a known interrelation between a pressure change gradient parameter and the fluid level with the aid of the instantaneous value of the pressure change gradient parameter. Since a pressure measurement is thus to take place in order to determine this, it is advantageous to use such a measurement also for testing the leaktightness of the tank.

It is particularly advantageous to detect initially the pressure change gradient during the building up of partial vacuum in the tank and then to determine the pressure change gradient during the reduction of the partial vacuum in the tank and to determine sufficient leaktightness of the tank with the aid of the quotient formed from these two gradients. An example for detecting the leaktightness of the tank in this way is given briefly below. The product of the two gradients is preferably used as pressure change gradient parameter for the ultimate detection of the fluid level.

The fulfilment of the condition that the fuel vaporizes to a sufficiently low degree could be checked with the aid of a special gas sensor. However, it is simpler to use for this the customary method of lean correction testing by means of a lambda controller.

Sufficient leaktightness and a sufficiently low degree of vaporization of the fuel can be tested for initially so that the further sequence for determining the fluid level is only then carried out when these conditions are fulfilled, or the fluid level can be initially determined and the result is if necessary rejected if a subsequent testing of the aforesaid conditions shows that these conditions are not fulfilled.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Whenever gradients of the build-up and reduction of the partial vacuum are mentioned below, almost always the size of the gradient is to be understood. Only FIGS. 2a and 2b relate to gradients in respect of their sign.

Figure 1:
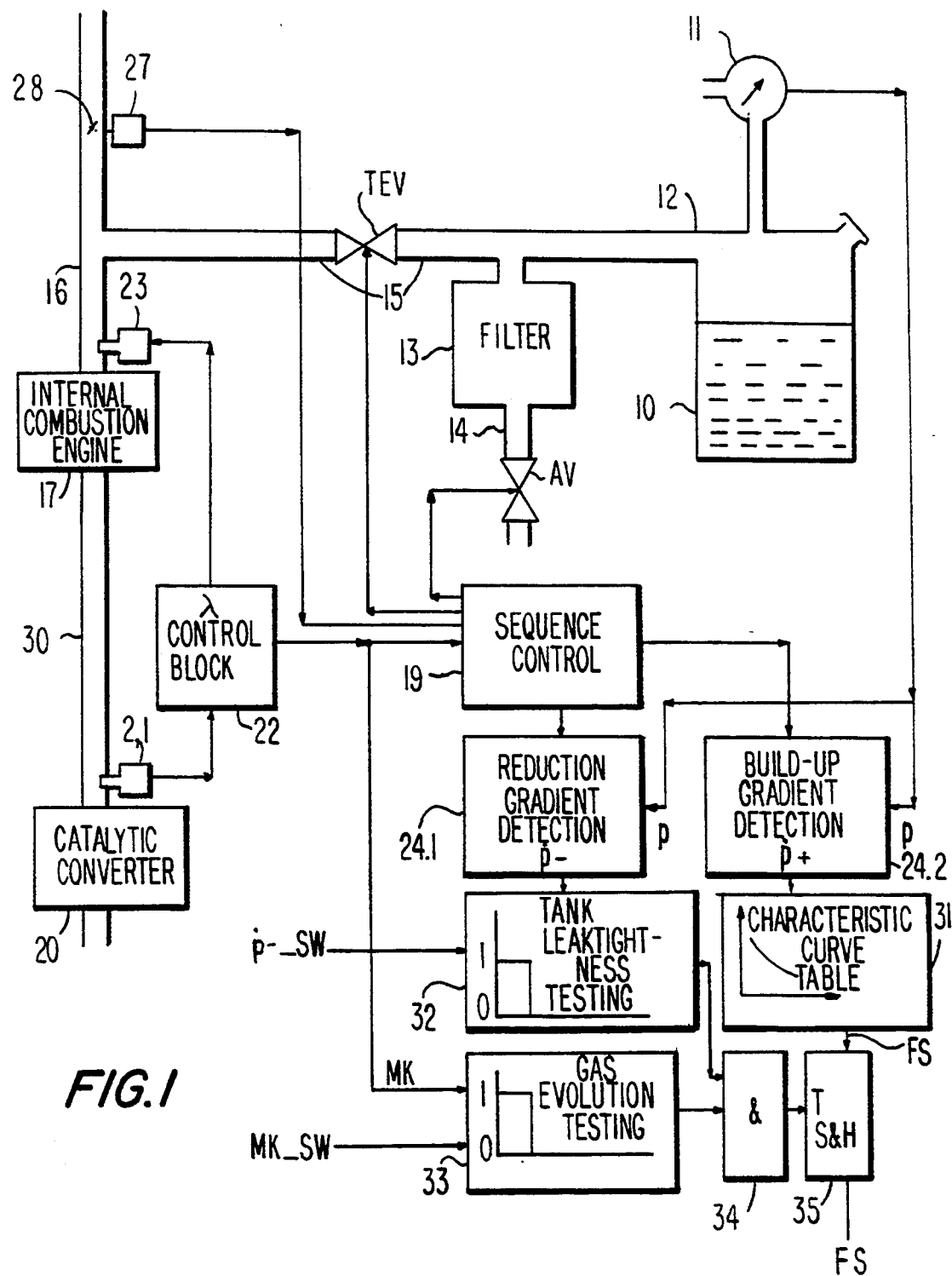
FIG. 1 shows a block diagram illustrating a method and a device for detecting the fluid level of fuel in the tank of a motor vehicle by producing pressure changes in a tank venting system and by evaluating pressure change gradients.

The tank venting system illustrated in, inter alia, FIG. 1 has a tank 10 with differential pressure meter 11, an adsorption filter 13 which is connected to the tank via a tank connecting line 12 and with a venting line 14 with inserted shut-off valve AV, and a tank venting valve TEV which is inserted into a valve line 15 which connects the adsorption filter 13 to the intake line 16 of an internal combustion engine 17. The tank venting valve TEV and the shut-off valve AV are actuated by signals such as are output by a sequence control block 19. The tank venting valve TEV is also controlled as a function of the operating state of the engine 17, but this is not illustrated in FIG. 1.

In the exhaust gas channel 30 of the engine 17 a catalytic converter 20 with lambda probe 21 located in front of it is arranged. The said lambda probe 21 outputs its signal to a lambda control block 22 which determines from it an actuation signal for an injection device 23 in the intake line 16 and, in addition, outputs a lean correction signal MK.

Figure 2A:
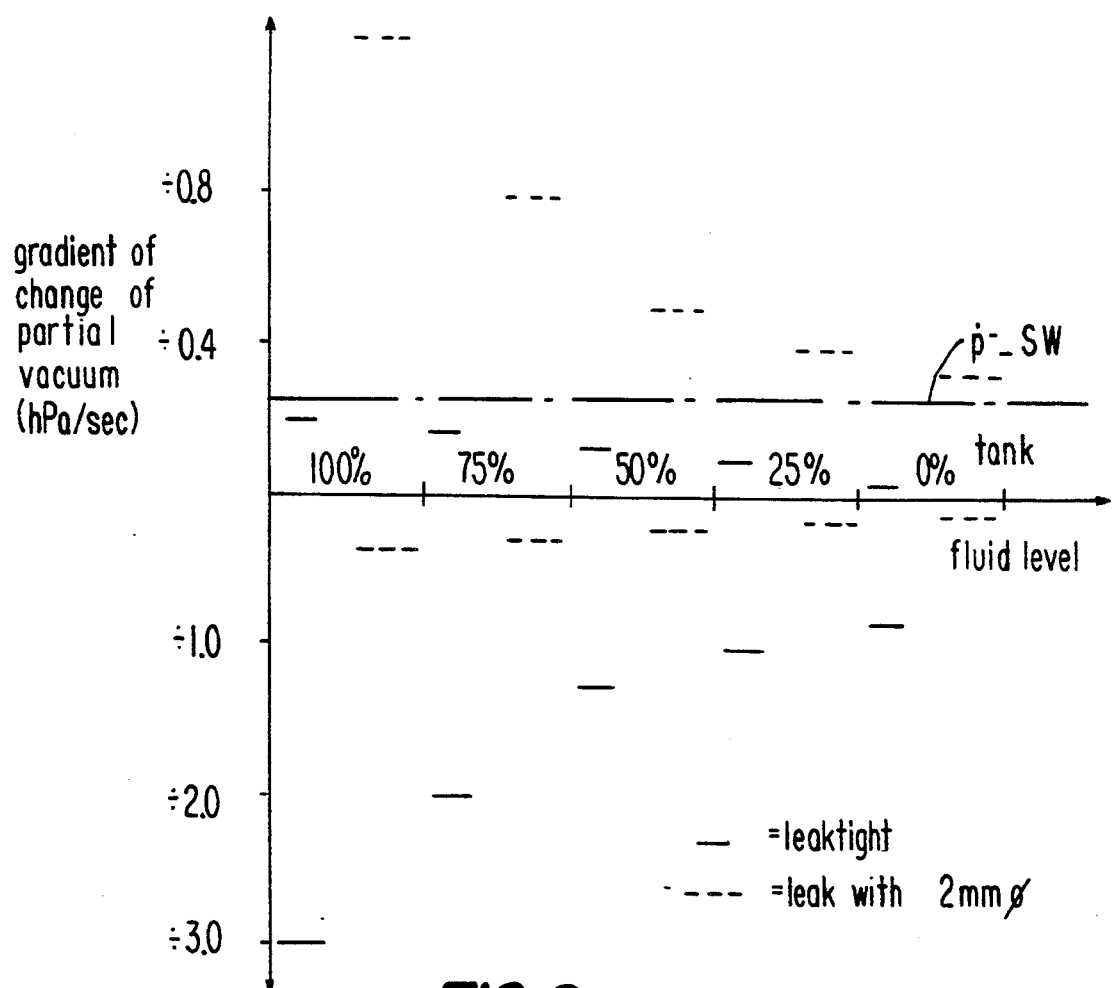
FIGS. 2a and 2b show diagrams relating to the values of partial vacuum change gradients (a) and quotients formed from such gradients (b) as a function of different fluid levels of a tank.
Figure 2B:
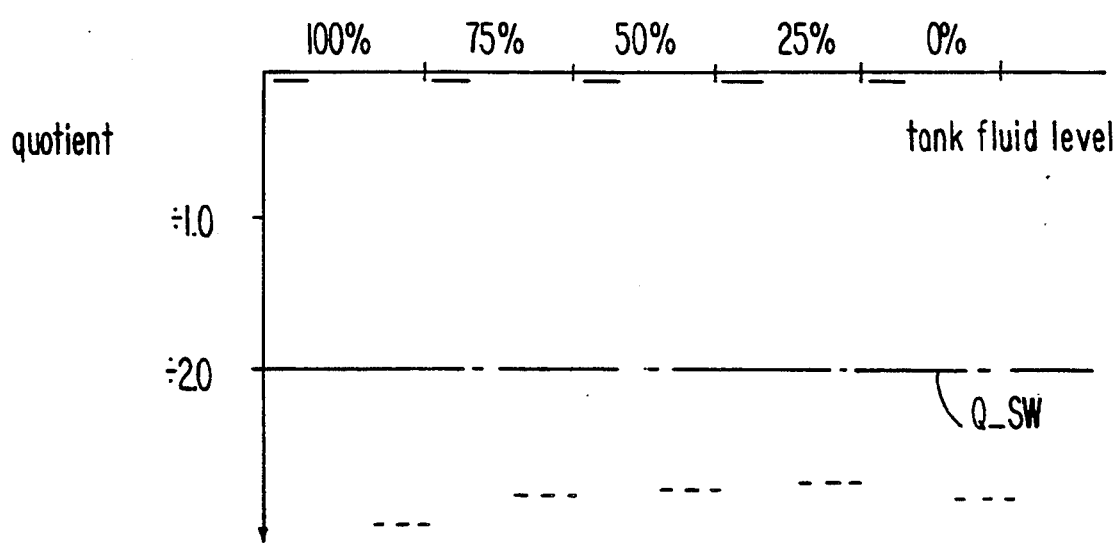

The diagram in FIG. 2a illustrates partial vacuum change gradients such as have been measured with a 2.5 1-six cylinder engine when idling with the tank venting valve completely opened for different fluid levels in a tank with 80 1 capacity. Two pairs of measurement values are entered for each fluid level with short lines in each case. The continuous lines here relate to measurements for the pressure reduction gradient (top) and the pressure build-up gradient (below) for a serviceable tank venting system, whilst the broken lines represent the corresponding values for a system with a leakage of 2 mm diameter. FIG. 2b shows tile reduction gradient-/build-up gradient quotient for each pair of gradients in FIG. 2a.

The function blocks in FIG. 1 for detecting the fluid level of fuel in the tank of a motor vehicle are as follows: a sequence control block 19, a reduction gradient detection block 24.1, a build-up gradient detection block 24.2, a characteristic curve table 31, a tank leaktightness testing block 32, a gas evolution testing block 33, an AND block 34 and a sample/hold block 35. The sequence control block 19 initiates a procedure for detecting the fluid level FS as soon as an idling signal generator 27 which interacts with the throttle valve 28 of the engine indicates idling. It terminates the sequence as soon as the idling state is terminated or a lean correction signal MK is output by the lambda control block 22. During the test sequence, the sequence control block controls the shut-off valve AV and the tank venting valve TEV in a predetermined manner as is described further below with reference to the flow diagram of FIG. 3 for an exemplary embodiment.

It is to be noted that the sequence control block 19 can, if desired, also evaluate other signals, for example a movement signal which indicates the stationary state or slow movement of the respective vehicle. If the conditions just mentioned are fulfilled, it is to be assumed that the fuel in the tank is not moving, or is hardly moving at all, and, as a result, the fuel in the tank is hardly vaporizing and hardly swilling around. Swilling around of the fuel leads to undesired changes at the pressure sensor 11 due to the volume of gas which is connected to the pressure sensor decreasing and increasing as a result of the moving fuel. The idling signal also indicates a stationary vehicle. Furthermore, the idling signal indicates that there is a pronounced partial vacuum in the intake line 16, which ensures that there is a large pumping capacity for producing a partial vacuum in the tank venting system. In addition, easily defined conditions for the suction capacity can then be established. However, the idling condition can be dispensed with if the method for determining the fluid level continuously checks how much gas is flowing through the tank venting valve and then standardizes a detected pressure build-up gradient to this predetermined flow rate with the aid of the detected gas flow rate and a predetermined flow rate. The quantity of gas flowing through the tank venting valve can be determined with the aid of the partial vacuum in the intake line 16 and with the aid of the pulse duty factor and the through-flow characteristic curve of the tank venting valve. In this process, the partial vacuum in the intake line 16 can either be measured or determined from the position of the throttle valve 28 and the speed of the engine 17.

With the aid of the build-up gradient p+, detected in the build-up gradient detection block 24.2, for the partial vacuum in the tank, the fluid level FS, is read out in the characteristic curve block 21 from the table of a (FS-$\dot{p}$+) characteristic curve stored there, which fluid level FS is then continuously output to the sample/hold block 35 and accepted by the latter when the AND block 34 transmits a trigger signal to the trigger input T of the sample/hold block. This trigger signal is then supplied if both the tank leaktightness testing block 32 and the gas evolution testing block 33 each output a high-level signal. The tank leaktightness testing block 32 outputs the high-level signal whenever the reduction gradient $\dot{p}$— detected by the reduction gradient detection block 24.1 remains below a predetermined threshold value p— SW. The gas evolution testing block 33 correspondingly outputs the high-level signal when the lean correction value MK supplied by the lambda control block 22 remains below a predetermined lean correction threshold value MK_SW.

Figure 3:
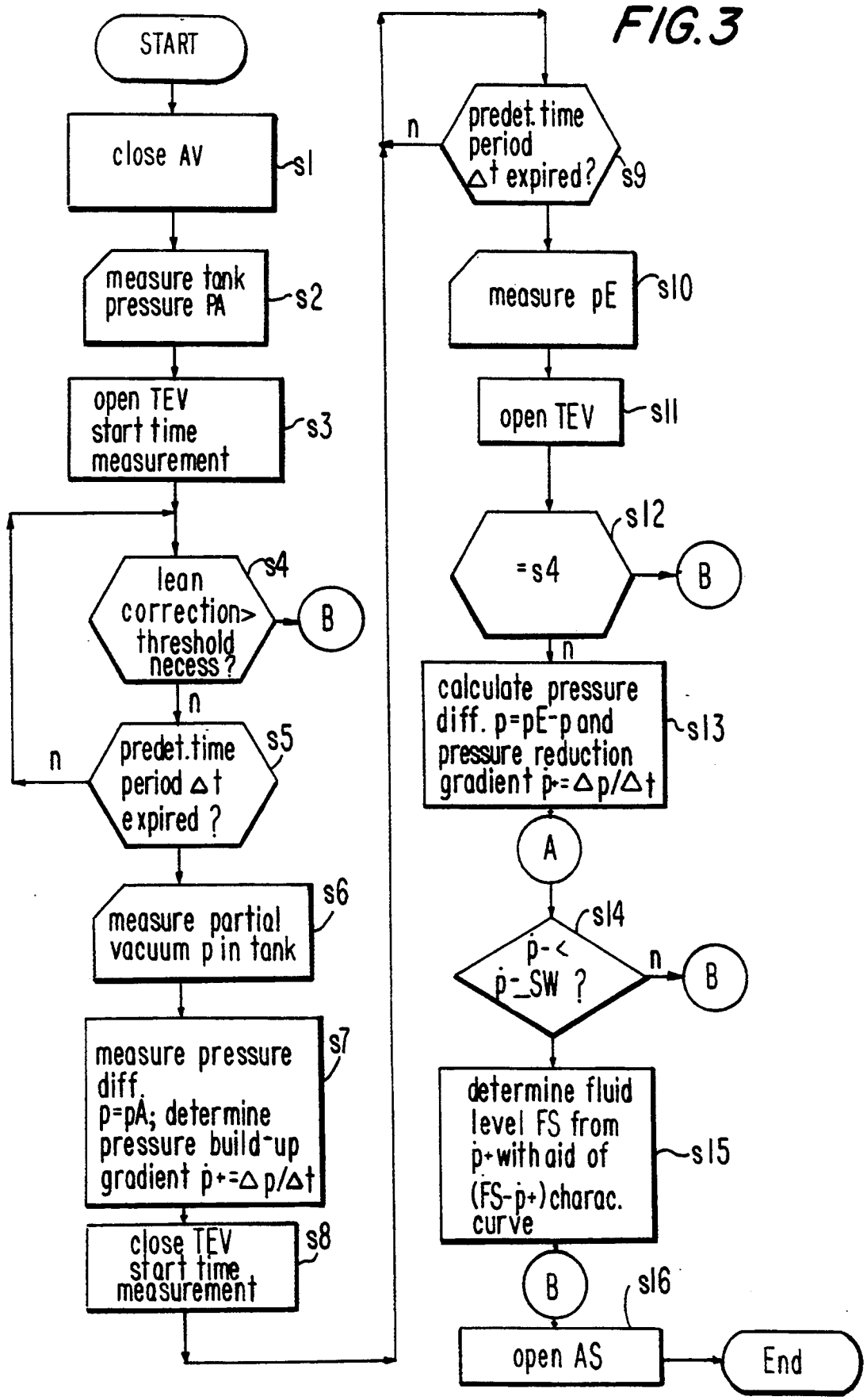
FIG. 3 shows a flow diagram explaining in detail a first exemplary embodiment of a method for detecting the fluid level of fuel in the tank of a motor vehicle.

At the start of the method in FIG. 3, the shutoff valve AV is closed (step s1), the tank differential pressure pA is measured (step s2) and the tank venting valve TEV is opened and a time measurement started (step s3). In a loop, it is then investigated whether the lambda control 22 has to perform a lean correction which is greater than a threshold (step s4) and whether a predetermined time period Δt has expired (step s5). If a lean correction which is greater than a threshold lean correction is necessary, the end of the method is reached from a mark B. This threshold lean correction can be between 5 and 10%, that is to say have clearly detectable effects. It has been shown that the gradient for the build-up of partial vacuum in the tank is hardly influenced by volatile fuel if this vaporization becomes apparent as a result of lean correction up to the aforesaid order of magnitude.

If the loop with the steps s4 and s5 is left due to the time period Δn having expired, the partial vacuum p present at this time is measured (step s6) and the pressure differential Δp=p−pA and the pressure buildup gradient $\dot{p}$+ =Δp/Δt are calculated (step s7). This pressure build-up gradient is a measure of the fluid level in the tank provided that, apart from the condition already checked for in step s4 that fuel is not vaporizing, the condition that the tank is sufficiently leaktight is also fulfilled.

Instead of running through the steps s4 to s6 just mentioned, the procedure adopted may be that the system is interrogated as to whether a predetermined pressure differential has been achieved.

The leaktightness test mentioned above takes place in steps s8 to s14 and preferably does not proceed until the partial vacuum measured in step s6 has reached a minimum value, for example −15 hPa (this is not illustrated in FIG. 3). In step s8, the tank venting valve TEV is closed and a new time measurement is started. As soon as a set time period Δt has expired (step s9), the partial vacuum pE then present in the tank is measured (step s10) and the tank venting valve is opened again (step s11). After the tank venting valve closes in step s8, the partial vacuum is reduced only very slowly if the system is leaktight and the fuel does not vaporize. In order to check whether the condition just mentioned is fulfilled, it is checked in a step s12 corresponding to step s4 whether, after the renewed opening of the tank venting valve in step s11, a lean correction by means of a threshold lean correction is required. If this is the case, the mark B is reached again. Otherwise, the pressure differential Δp=pE−p and the pressure reduction gradient p—=Δp/Δt are calculated (step s13). If the pressure reduction gradient is not smaller than a threshold value (step s14), the mark B is reached again. Actually, at this point a fault report is also output which indicates that the tank is not leaktight but in the context of the present invention details of a leaktightness test are not important, for which reason the method in FIG. 3 is of a very simple design in this respect and also the indication of a fault report is not shown.

If the tank proves to be sufficiently leaktight in step s14, in step s15 the pressure build-up gradient p+ calculated in step s7 is used to determine the fluid level FS from a (FS-p+) characteristic curve which has been applied on a testing stand for the present tank venting system.

In order to terminate the method, the shut-off valve AV is opened (step s16) after the mark B, mentioned repeatedly above, is passed through. This valve then remains opened until the next fluid level measurement or until a tank leaktightness test if the latter is carried out by means of a pressure test.

Figure 4:
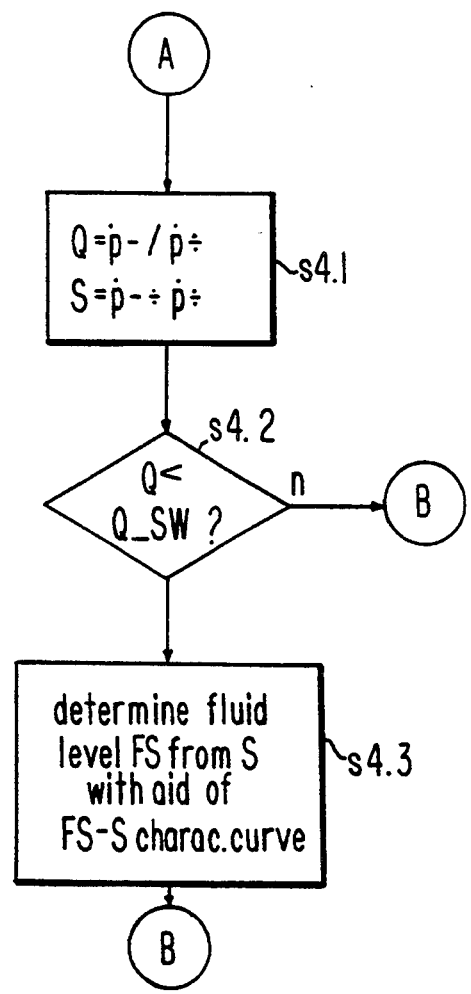
FIG. 4 shows a part of a flow diagram which replaces the procedure sequence between the marks A and B in the diagram in FIG. 3 and thus serves to illustrate a second exemplary embodiment.

The method steps s14 and s15 carried out between the marks A and B in FIG. 3 can be replaced by the variant according to FIG. 4 with steps s4.1 to s4.3. This variant utilizes the ratios according to FIG. 2B derived from the diagram in FIG. 2A and leads to more accurate measurement results, albeit with a somewhat increased computing complexity.

In a step s4.1, the quotient $\dot{p}$−/$\dot{p}$+ explained with reference to FIG. 2B is formed. In addition, the sum of the reduction gradient $\dot{p}$− and build-up gradient $\dot{p}$+ is formed, as a result of which the influence of the tank fluid level on these gradients is not eliminated, as in the case of the quotient, but rather is increased further. The quotient is accordingly a very good measure for assessing leaktightness of the tank independently of the fluid level whilst the sum is a very good measure for determining the fluid level. A similarly good measure for estimating the fluid level is the product of the gradients but this depends to a greater extent on small leaks than does the sum.

In step s4.2, the quotient is compared with a threshold value. If the quotient is not smaller than the threshold value this signifies that the system is not leaktight, for which reason a sequence takes place, as was explained above after step s14 for the case of a system which is not leaktight. If, on the other hand, the system is leaktight, in step s4.3 the fluid level is determined from the sum S with the aid of an FS-S characteristic curve which like the characteristic curve of step s15, has been previously applied on a testing stand.

It is to be noted that instead of the reduction gradient-/build-up gradient quotient the reciprocal value of this quotient can also be used. Then, the threshold value interrogation in step s4.2 must also be reversed.

The only thing that is essential for the invention in the abovementioned exemplary embodiments is that the fluid level is determined from the build-up gradient or the quotient formed from pressure reduction gradient and pressure build-up gradient, that is to say expressed in general terms from a pressure change gradient parameter, if it has been previously ensured, or is subsequently ensured, that the degree of vaporization of the fuel is sufficiently low and the tank is sufficiently leaktight. The methods are advantageous to the extent that pressure measuring values are used for testing the leaktightness and determining the fluid level. In the variant according to FIG. 4, identical measurement values are used for determining the fluid level and for testing the leaktightness, only in the one case as the sum and in the other case as a quotient. Accordingly, when the leaktightness test has already taken place, all that is necessary to determine the fluid level is, for example, to add or multiply already existing values and to read out the fluid level from a characteristic curve which is present either as a table or in the form of an equation.

It will be understood that each of the elements described above, or two or more together, may also find a useful application in other types of methods and constructions differing from the types described above.

While the invention has been illustrated and described as embodied in a method and device for detecting the fluid level in a tank, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for detecting a fluid level of fuel in a tank of a motor vehicle, the method comprising the steps of assessing tank conditions whether the tank at least achieves a predetermined leaktightness and whether the fuel vaporized less than corresponds to a predetermined value; and if the conditions are fulfilled, detecting a fuel level, said detecting including subjecting a volume of the tank to pressure changes, determining an associated value of a pressure change gradient parameter from at least one achieved pressure change and one time period associated therewith due to said pressure changes, and estimating an instantaneous value of the fluid level from a known interrelation between the pressure change gradient parameter and the fluid level, said subjecting includes obtaining the pressure change in form of a build-up of partial vacuum in the tank with a tank venting system by closing a shut-off valve in a venting line of an adsorption filter connected to the tank and opening a tank venting valve in a valve line between the adsorption filter and an intake line of an internal combustion engine of the motor vehicle.

2. A method as defined in claim 1, wherein said subjecting includes achieving the pressure change in form of a reduction in partial vacuum in the tank with a tank venting system by closing a shut-off valve in a venting line of an adsorption filter connected to the tank, opening a tank venting valve in a valve line between the adsorption filter and an intake line of an internal combustion engine of the motor vehicle until at least one predetermined pressure is reached, and then closing the tank venting valve again and thereafter reducing the partial vacuum in the tank.

3. A method as defined in claim 2, and further comprising detecting a reduction gradient occurring during the reduction in partial vacuum, said assessing including assuming a sufficient leaktightness of the tank if the reduction gradient remains below a predetermined threshold value.

4. A method as defined in claim 2, and further comprising checking at least one operating parameter of the motor vehicle whose measurement values indicate whether the vehicle and thus contents of the tank are moving, starting from a closing time of the tank venting valve.

5. A method as defined in claim 2, and further comprising detecting a build-up gradient occurring during a build-up of partial vacuum; detecting a reduction gradient occurring during the reduction in the partial vacuum; detecting a quotient formed from the build-up gradient and reduction gradient, said assessing includes assuming the leaktightness of the tank if the quotient observes a predetermined relation with a predetermined threshold value.

6. A method as defined in claim 1, and further comprising detecting a build-up gradient occurring during a build-up of partial vacuum; detecting the reduction gradient occurring during a reduction in the partial vacuum; detecting a quotient formed from the build-up gradient and reduction gradient, said assessing includes assuming the leaktightness of the tank if the quotient observes a predetermined relation with a predetermined threshold value.

7. A method for detecting a fluid level of fuel in a tank of a motor vehicle, the method comprising the steps of assessing tank conditions whether the tank at least achieves a predetermined leaktightness and whether the fuel vaporized less than corresponds to a predetermined value;

if the conditions are fulfilled, detecting a fuel level, said detecting including subjecting a volume of the tank to pressure changes, determining an associated value of a pressure change gradient parameter from at least one achieved pressure change and one time period associated therewith due to said pressure changes, and estimating an instantaneous value of the fluid level from a known interrelation between the pressure change gradient parameter and the fluid level, said subjecting includes obtaining the pressure change in form of a build-up of partial vacuum in the tank with a tank venting system by closing a shut-off valve in a venting line of an adsorption filter connected to the tank, and opening a tank venting valve in a valve line between the adsorption filter and an intake line of an internal combustion engine of the motor vehicle; and detecting a build-up gradient occurring during the build-up of partial vacuum, and using it as the pressure change gradient parameter for determining the fluid level.

8. A method for detecting a fluid level of fuel in a tank of a motor vehicle, the method comprising the steps of assessing tank conditions whether the tank at least achieves a predetermined leaktightness and whether the fuel vaporized less than corresponds to a predetermined value;

if the conditions are fulfilled, detecting a fuel level, said detecting including subjecting a volume of the tank to pressure changes, determining an associated value of a pressure change gradient parameter from at least one achieved pressure change and one time period associated therewith due to said pressure changes, and estimating an instantaneous value of the fluid level from a known interrelation between the pressure change gradient parameter and the fluid level, said subjecting includes obtaining the pressure change in form of a build-up of partial vacuum in the tank with a tank venting system by closing a shut-off valve in a venting line of an adsorption filter connected to the tank, and opening a tank venting valve in a valve line between the adsorption filter and an intake line of an internal combustion engine of the motor vehicle;

detecting a build-up gradient occurring during the build-up of partial vacuum; and detecting a reduction gradient occurring during the reduction in the partial vacuum, and combining the build-up gradient and the reduction gradient mathematically in such a way that an influence of the fluid level is apparent as clearly as possible and a combination parameter is produced and used as the pressure change gradient parameter for determining the fluid level.

9. A method as defined in claim 8, wherein said combining includes adding the build-up gradient and the reduction gradient and using their sum as the pressure change gradient parameter.

10. A method for detecting a fluid level of fuel in a tank of a motor vehicle, the method comprising the steps of assessing tank conditions whether the tank at least achieves a predetermined leaktightness and whether the fuel vaporized less than corresponds to a predetermined value;

if the conditions are fulfilled, detecting a fuel level, said detecting including subjecting a volume of the tank to pressure changes, determining an associated value of a pressure change gradient parameter from at least one achieved pressure change and one time period associated therewith due to said pressure changes, and estimating an instantaneous value of the fluid level from a known interrelation between the pressure change gradient parameter and the fluid level, said subjecting includes achieving the pressure change in form of a reduction in partial vacuum in the tank wit a tank venting system by closing a shutoff valve in a venting line of an adsorption filter connected to the tank, opening a tank venting valve in a valve line between the adsorption filter and an intake line of an internal combustion engine of the motor vehicle until at least one predetermined pressure is reached, and then closing the tank venting valve again and thereafter reducing the partial vacuum in the tank; and detecting a build-up gradient occurring during the build-up of partial vacuum; detecting a reduction gradient occurring during the reduction in the partial vacuum, and combining the build-up gradient and the reduction gradient mathematically in such a way that an influence of the fluid level is apparent as clearly as possible and a combination parameter is produced and used as the pressure change gradient parameter for determining the fluid level.

11. A method as defined in claim 10, wherein said combining includes adding the build-up gradient and the reduction gradient as absolute values and using their sum as the pressure change gradient parameter.

12. A device for detecting a fluid level of fuel in a tank of a motor vehicle, comprising tank leaktightness testing means;

gas evaluation testing means for testing whether the fuel in the tank vaporizes;

pumping-out/sequence control means for subjecting the tank to a pressure change with respect to time;

gradient detecting means for detecting a value of a pressure change gradient parameter from at least one pressure change and one time period associated therewith; and fluid level output means which receives signals from said tank leaktightness testing means, said gas evaluation testing means, and said gradient detecting means in order to output an instantaneous value of the fluid level with the aid of a known interrelationship between the pressure change gradient parameter and the fluid level whenever the tank is sufficiently leaktight and the vaporization of the fuel is sufficiently low.

* * * * *